(12) United States Patent
Le Ludec et al.

(10) Patent No.: US 7,769,055 B2
(45) Date of Patent: Aug. 3, 2010

(54) METHOD OF TRANSMITTING MPEG STREAMS OVER IP AND CORRESPONDING DEVICE, RECEIVING METHOD AND RECEIVER

(75) Inventors: Benoit Le Ludec, Cesson Sevigne (FR); Jean-Luc Soulard, Rennes (FR); Bertrand Provost, Saint Gregoire (FR); Jérome Tas, Lassy (FR)

(73) Assignee: Thomson Licensing, Boulogne-Billancourt (FR)

( * ) Notice: Subject to any disclaimer, the term of this patent is extended or adjusted under 35 U.S.C. 154(b) by 115 days.

(21) Appl. No.: 11/795,006

(22) PCT Filed: Jan. 11, 2006

(86) PCT No.: PCT/EP2006/050148

§ 371 (c)(1),
(2), (4) Date: Dec. 5, 2007

(87) PCT Pub. No.: WO2006/075007

PCT Pub. Date: Jul. 20, 2006

(65) Prior Publication Data
US 2008/0219296 A1    Sep. 11, 2008

(30) Foreign Application Priority Data
Jan. 11, 2005   (FR) .................................. 05 50100

(51) Int. Cl.
*H04J 3/04* (2006.01)
(52) U.S. Cl. .................... 370/516; 370/517; 370/395; 370/500

(58) Field of Classification Search ......... 370/200–253, 370/272–390, 431–546
See application file for complete search history.

(56) References Cited

U.S. PATENT DOCUMENTS

| | | | |
|---|---|---|---|
| 5,640,388 A * | 6/1997 | Woodhead et al. | 370/468 |
| 5,790,543 A * | 8/1998 | Cloutier | 370/252 |
| 5,966,387 A | 10/1999 | Cloutier | |
| 7,526,000 B2 * | 4/2009 | Van Gestel | 370/516 |
| 2002/0003799 A1 | 1/2002 | Tomita | |
| 2005/0036521 A1 | 2/2005 | Kim et al. | |

FOREIGN PATENT DOCUMENTS

| | | | |
|---|---|---|---|
| EP | 0987894 A2 | | 8/1999 |
| WO | WO 2004/010670 | | 1/2004 |
| WO | WO 2004010670 | * | 1/2004 |

OTHER PUBLICATIONS

Search Report Dated Jun. 2, 2006.

* cited by examiner

*Primary Examiner*—Ricky Ngo
*Assistant Examiner*—Iqbal Zaidi
(74) *Attorney, Agent, or Firm*—Robert D. Shedd; Jeffrey M. Navon

(57) ABSTRACT

The invention concerns a method of transmitting, via a sending device, a data stream made up of data packets, at least some of these packets including time references for synchronizing the clocks of the sender and the receiver. The method includes at least a correction of the time references by the sender so as the receiver can offset the jitter introduced by the transmission. The invention is used to offset these losses of accuracy. The invention concerns also the device and corresponding receiver and reception method.

7 Claims, 3 Drawing Sheets

METHOD OF TRANSMITTING MPEG STREAMS OVER IP AND CORRESPONDING DEVICE, RECEIVING METHOD AND RECEIVER

This application claims the benefit, under 35 U.S.C. §365 of International Application PCT/EP2006/050148, filed Jan. 11, 2006, which was published in accordance with PCT Article 21(2) on Jul. 20, 2006 in English and which claims the benefit of French patent application No. 0550100 filed Jan. 11, 2005.

TECHNICAL FIELD

The present invention relates to the field of transporting audio/video services over an IP network. More specifically, it relates to the transport of MPEG (Moving Picture Expert Group) streams using the RTP (Real Time Protocol) protocol.

BACKGROUND OF THE INVENTION

RFC (Request For Comments) 3550 [3] describes means for transporting streams having time constraints over IP and specifies the attachment of a time reference (Timestamp) to each RTP packet.

RFC 2250[4] describes how a number of MPEG-2 transport packets can be transported within the data part of an RTP packet.

The MPEG-2 specification [1] describes how to include time references in an MPEG-2 stream and how, at the destination, the different time references are used to resynchronize the clock with that of the source. Also described is how the time references are used by the MPEG decoder to control the moments at which the elements contained in the transmitted stream are displayed.

The DVB-IP specification [5] describes a general architecture for the distribution of multimedia services over IP networks. This specification adopts RFC 2250 as the mechanism for transporting MPEG-2 streams over RTP.

The Pro-MPEG forum (Pro-MPEG Wide Area Networking group) has published a code of practice (number 3) which also adopts RFC 2250 as the multimedia stream transport mechanism. Together with DVB-IP, there is therefore an end-to-end architecture for services over IP providing interworking for equipment based on RFC 2250.

The time reference included in the MPEG-2 packets, called PCR (Program Clock Reference), is a time reference based on a clock with a precision of 27 MHz. This reference is not included in all the MPEG packets, but only in some of them. The rate of the stream is assumed constant between the packets conveying a PCR reference.

For its part, the time reference attached to each RTP packet is based on a clock with a precision of 90 kHz, therefore significantly less accurate. In the RTP case, each packet contains just one time reference. The realignment at destination of the RTP packets is therefore based on the precision of the RTP clock, or 90 kHz.

SOLVED PROBLEM

It can therefore be seen that the use of these mechanisms generates a modification of the time sequencing of the MPEG packets. This modification comes on the one hand from the fact that the MPEG-2 packets are grouped within an RTP packet. This approach means packets sent by the source at different times will ultimately be transmitted grouped in an RTP packet containing only one time reference and will therefore be received grouped by the destination at a time realigned with an accuracy 300 times less than that of the time references, the PCRs, included in these packets. It is therefore essential to deal with a first source of modification of the time sequencing due to the grouping and a second source of modification due to the realignment of the RTP packets at 90 kHz and not at 27 MHz.

SUMMARY OF THE INVENTION

The invention can be used to offset these losses of accuracy. It is based on a correction at source of the value of the time references, the PCRs, inserted in MPEG packets. This correction at source of the time references is used to correct the jitter introduced in the transport. In this way, the value of the PCR corresponds more accurately to its place in the stream at destination.

The invention relates to a method of transmitting, via a sending device, a data stream made up of data packets, at least some of these packets including time references for synchronizing the clocks of the sender and the receiver, characterized in that it includes at least the following step:
 a correction of the time references by the sender so as to offset the jitter introduced by the transmission.

According to a particular embodiment of the invention, the method includes the following steps:
 temporary storage of the data packets in a buffer to make up sets of packets for transport;
 correction of the time references conveyed by at least some of the packets adding the time spent in the buffer.

According to a particular embodiment of the invention, the method includes the following steps:
 since the packets are transmitted between the sender and the receiver by transport protocol handling the reconstruction of the time sequencing by the receiver according to a clock of lesser accuracy than that used by the time references, the correction of said time references by the difference between the two clocks at the moment when the packet conveying this time reference is sent.

According to a particular embodiment of the invention, the method includes the following steps:
 since the packets are transmitted between the sender and the receiver by transport protocol handling the reconstruction of the time sequencing by the receiver according to a clock of lesser accuracy than that used by the time references, a wait before sending the packets for the difference between the basic clock of the time references and that of lesser accuracy used to reconstruct the sequencing by the transfer protocol to be zero.

According to specific features, the packets are sent according to RTP protocol.

According to a preferred embodiment, the packets are comprising image data. These data can be compressed (eg according to MPEG 2 or 4 standards) or not (eg according to SDI standard).

The invention also relates to a sending device.

The invention concerns also a method of reception of a data stream made up of data packets, at least some of these packets including time references for synchronizing the clocks of the sender and the receiver. According to the invention, the method includes at least the following step:
 an offset of the jitter introduced by the transmission using a correction of the time references included in at least one data packet.

Then, the receiver offset, i.e. cancel totally or partially, the jitter. Preferably, the offset jitter is the jitter due to the transmitter. Advantageously, the receiver offset also the jitter due to the transmission channel at the same time.

The invention also relates to a sending device and receiver.

BRIEF DESCRIPTION OF THE DRAWINGS

The invention will be better understood, and other features and advantages will become apparent from reading the description that follows, the description referring to the appended drawings in which.

DETAILED DESCRIPTION OF THE INVENTION

The MPEG stream that needs to be transported is made up of a set of MPEG packets, normally of 188 bytes. These packets form a contiguous stream that is to be transmitted between a source device and a recipient device. The source device will therefore operate as the sender of the stream, whereas the recipient device will be the receiver. This stream will contain a multiplexed set of individual streams transporting the real time content, such as the audio and the video. To enable the recipient device to reconstruct the multimedia service evenly and with the various parts correctly synchronized, it is important to control the relative times between the packets and the synchronization between the source clock and the destination clock.

To do this, MPEG provides for the insertion, in certain packets of the stream, of a time reference called PCR for synchronizing the clocks between the source and the destination. These time references transmit the value of the source clock at the moment the packet was sent, and will be used on receipt of the packet to resynchronize the destination clock according to the known PLL (phase locked loop) principle.

This approach is all the more effective as the transport between the source and the destination is carried out transparently. In particular, it is important for the packet transport time to be as uniform as possible. The system adapts well to a latency as long as the latter is uniform, but synchronization soon suffers from non-uniform transport times.

When data packets are transmitted over an IP network, uniformity of the packet transfer time cannot be assured. The transmission can cause packets to be duplicated and packets to arrive out of order, since packets do not necessarily take the same path through the network. The RTP protocol attempts to remedy this state of affairs by recommending the addition of a time reference to each RTP data packet transmitted. This time reference is based on a 90 kHz clock. The destination of an RTP packet can therefore use this reference to realign the packets received with each other and reconstruct the time sequencing of the RTP packets received with the precision of this 90 kHz clock.

An MPEG stream is transported between a source and a destination over an IP network using the RTP protocol when the set of DVB-IP standards, pro-MPEG, are followed.

Figure 1:
FIG. 1 diagrammatically represents the steps in transmitting an MPEG-2 data stream in a manner known per se.
Figure 2:
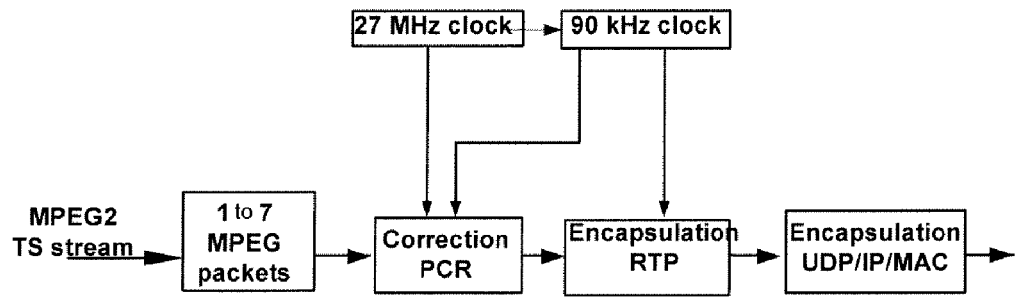
FIG. 2 diagrammatically represents these steps including the correction according to an embodiment of the invention.
Figure 3:
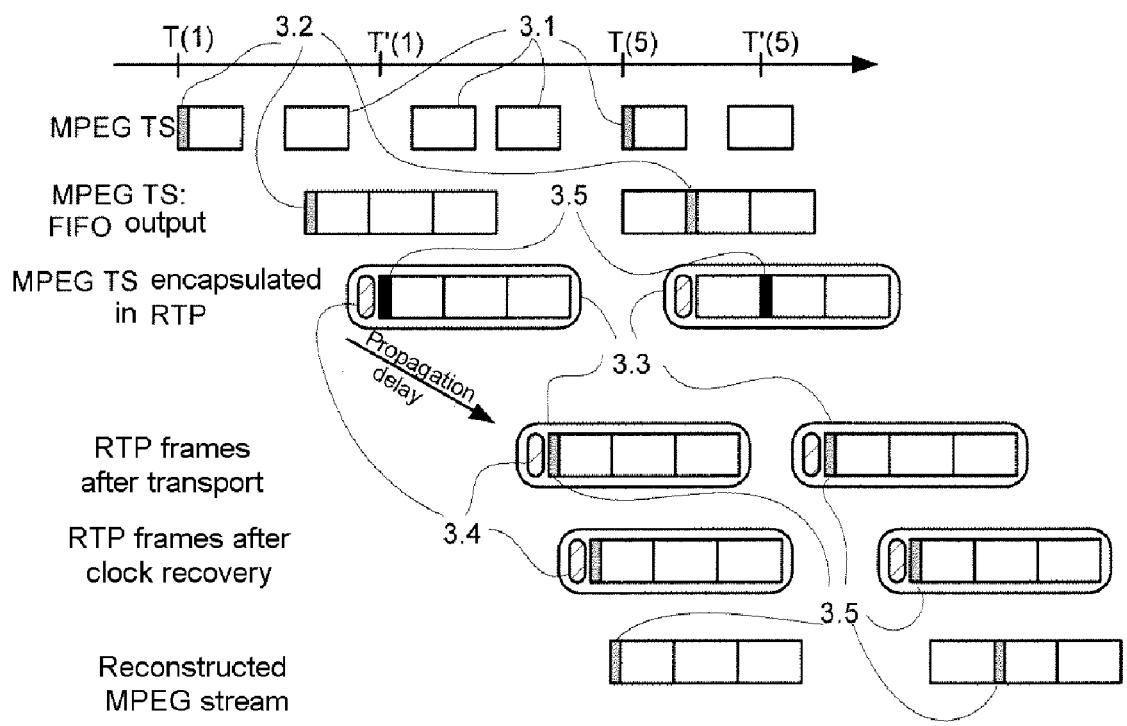
FIG. 3 represents the way the packets change over time when transmitted.

This transport is done by encapsulating the MPEG packets in RTP packets. The typical encapsulation consists in placing seven MPEG packets in one RTP packet. FIG. 3 shows how this encapsulation works. The MPEG packets, referenced 3.1, form an outgoing stream called MPEG TS (Transport Stream). Some of these packets carry a time reference, PCR, referenced 3.2. These packets are not transmitted immediately, they must be stored in FIFO buffers so as to construct the RTP packets, referenced 3.3. When an RTP packet is ready, it is sent complete with its RTP time reference, referenced 3.4, corresponding to the time at which the packet was sent. At the receiving end, the RTP packets are received according to a time sequencing that is not controlled after transport. The sequencing of these packets is corrected by use of the RTP time references with the precision of the RTP clock, in other words 90 kHz. The result is a reconstructed MPEG stream made up of groups of packets sequenced in time relative to a single time reference with a precision of 90 kHz.

This approach therefore results in a double modification of the relative sequencing between themselves of the MPEG packets: on the one hand, the introduction of a grouping of several packets having the same time reference and on the other hand the realignment of these groups with the lesser precision of 90 kHz.

The exemplary embodiment of the invention relies on the addition of correction to the PCR of the MPEG packets so as to make them correspond to the time sequencing reconstructed on arrival. These corrections are added to the PCRs referenced 3.5 in the figure. A first correction involves adding to the PCR the time between its arrival in the FIFO storage buffer and the moment at which the RTP packet is sent. In this way, a PCR attached to a packet that is part of a group and therefore of the same RTP packet will have a PCR consistent with the sending of the RTP packet.

This correction, which takes account, for each packet, of the time spent between the time at which the packet is input into the memory and its output time, can also be described as follows. This memory is used to store the 1 to 7 MPEG packets that form the data part of the RTP frame. The storage time of each packet will correspond to the time from its moment of arrival in the buffer to the moment of output from the buffer when the RTP frame is complete. This mechanism will therefore modify the time relations (creating jitter) between successive packets conveying PCR time information.

In order to know the time spent in the buffer, each MPEG packet is stored with the information of its time of arrival (called T_in) supplied by the PCR counter. The time at which the packet is output (called T_out) is supplied by the current value of the PCR counter at the moment when the packet is output. The correction made to the PCR of an MPEG packet consists in correcting the PCR value by the time (T_out−T_in) spent in memory.

PCR(i)=PCR value of packet number i
T_in(i)=time of arrival of packet i in the buffer
T_out(i)=time of departure of the packet i from the buffer
PCR'(i)=correction of the PCR value at buffer output $$PCR'(i)=PCR(i)+(T\_out(i)-T\_in(i))$$

This first correction will therefore correct the jitter created by the grouping effect.

The duly modified PCR is therefore consistent with the moment at which the RTP packet is sent. This packet will be received and its time sequencing corrected by means of the RTP-intrinsic time references mechanism. This packet will therefore be realigned at the destination end with the 90 kHz precision, but the PCRs included in the MPEG packets have a precision of 27 MHz, 300 times more accurate. The sequencing of the RTP packet will therefore be truncated to the lower integer value of the 90 kHz clock relative to the actual moment of sending considered relative to the 27 MHz clock.

A first solution for correcting the precision difference between the two clocks is to introduce a second correction because, at source, the presence of a 27 MHz clock means that the moment when the RTP packet was sent can be known to this scale. It is therefore possible to calculate the difference between the value taken by the 90 kHz time reference of the RTP packet and the same value with the precision of the 27 MHz clock. This difference will be added to the PCR so that this PCR is consistent at its destination with the sequencing realigned to 90 kHz of the RTP packets having been used for transport.

If the term PCR"(i)= is used to denote the final correction of the PCR taking into account the rounding to 90 kHz of the RTP and "extension" to mean the difference between the value of the 27 MHz clock and the 90 kHz clock:

$$PCR''(i)=PCR'(i)-\text{extension}$$

Another solution consists in blocking the RTP frame and sending it when the difference between the 27 MHz clock and the 90 kHz clock returns to 0. The correction to be made PCR" is identical to PCR' since the extension is 0. This solution costs bandwidth since the duration between two RTP frame starts must be a multiple of 1/90 kHz.

Figure 4:
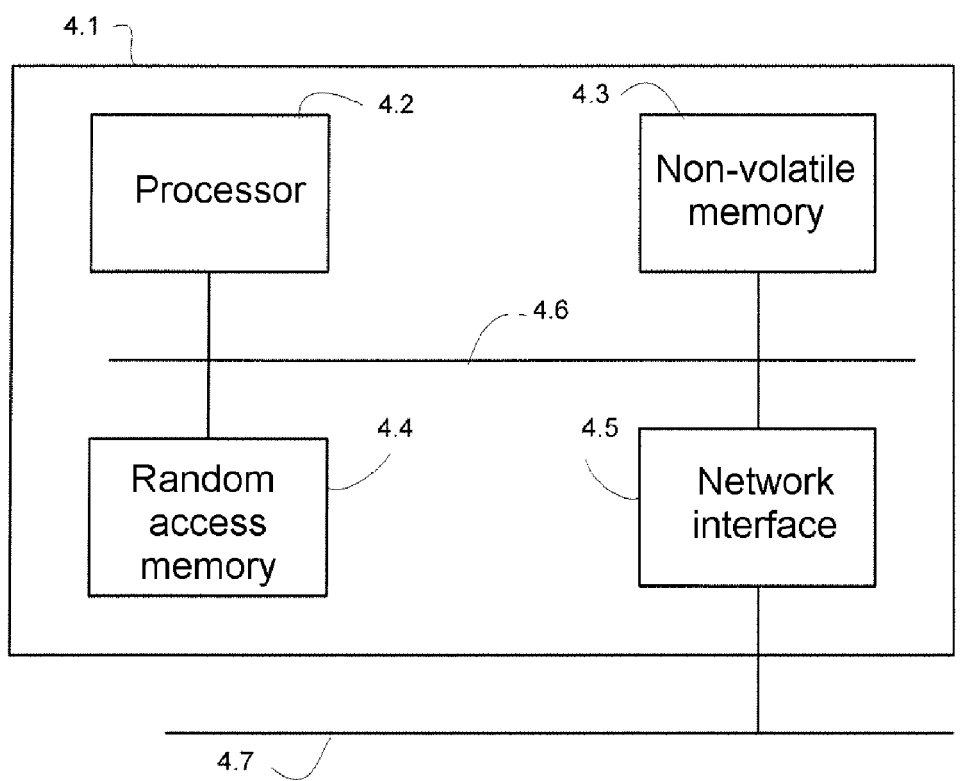
FIG. 4 represents an exemplary architecture of a device capable of sending a stream according to an embodiment of the invention.

An exemplary device capable of implementing the invention is illustrated in FIG. 4. This device, 4.1, is connected to an IP network, 4.7, via a network interface 4.5. It has a processor, 4.2, capable of implementing the methods described. This processor uses its memory, 4.4, to execute these methods. The streams sent will, for example, be taken from the non-volatile memory 4.3, the latter possibly comprising a disk. Any other implementation, whether software or hardware, is possible without departing from the context of the invention.

The exemplary embodiment discloses the invention in a non-limiting way. Any other correction of the time references of the stream so as to take account preventively of a jitter whose characteristics are known falls within the context of the invention.

REFERENCES

[1] ISO/IEC 13818-1:2000 *Information technology—Generic coding of moving pictures and associated audio information: Systems*, International Standards Organization. http://www.iso.org/iso/en/CatalogueDetailPage.CatalogueDetail?CSNUMBER=31537
ISO/IEC 13818-2:2000 *Information technology—Generic coding of moving pictures and associated audio information: Video*, International Standards Organization. http://www.iso.org/iso/en/CatalogueDetailPage.CatalogueDetail?CSNUMBER=31539

[2] MPEG-4 Video: ITU-T Rec H.264|ISO/IEC 14496-10 Information Technology—coding of audio-visual objects—Part 10: Visual

[3] IETF RFC 3550, *RTP: A Transport Protocol for Real-Time Applications*, H. Schulzrinne et al., July 2003, available at http://www.iet.org/rfc/rfc3550.txt

[4] IETF RFC 2250, *RTP Payload Format for MPEG1/MPEG2 Video*, D. Hoffman et al., January 1998, available at http://www.ietf.org/rfc/rfc2250.txt

[5] DVB TM3022, *Digital Video Broadcasting (DVB)—Transport of DVB Services over IP*, ETSI, RTS/JTC-DVB-93, 2004 Mar. 26

[6] ARIB* STD-B24 Version 3.2, *Data Coding and Transmission Specification for Digital Broadcasting*, Association of Radio Industries and Businesses, Nov. 15, 2001.

[7] Digital Living Network Alliance—*Home Networked Device Interoperability Guidelines Version:* 1.0

The invention claimed is:

1. Method of transmitting, via a sending device, of a data stream made up of data packets, where at least some of said data packets include a first time reference of a first accuracy for synchronizing clocks of said sending device and at least one receiver, wherein said method includes at least the following steps:
   encapsulation of at least one of said data packets in one of a MPEG packet which carries an RTP packet;
   storing the data packet in a FIFO buffer to construct the RTP packet, wherein when an RTP is ready it is sent competes with its RTP time reference corresponding to the time at which the packet was sent;
   upon transmission of said transport protocol packet, adding, to said transport protocol packet, of a second time reference for all of said at least one packet in said MPEG packet, said second time reference corresponding to a time of transmission of said MPEG packet, said second time reference having a second accuracy, and correction of said first time reference, the correction of said first time reference taking into account a difference in accuracy between a first clock having a same accuracy as said first time reference and a second clock of second accuracy used by said second time references, said second clock being derived from said first clock, and wherein the second accuracy is derived from a difference between said first and second clock frequencies.

2. Method according to claim 1, including the following steps temporary storage of the first data packets in a buffer to make up sets of packets for transport; correction of the first time reference by adding the to said first time reference a time between arrival of said first data packet in said buffer and transmission of a transport protocol packet comprising said first data packet.

3. Method according to claim 1, wherein said correction of said first time reference comprises adding to said first time reference of a difference between said second time reference and a value of said second time reference with the precision of said first clock.

4. Method according to claim 1, wherein the transmission of said transport protocol packet is blocked until a difference between the first clock and the second clock is zero.

5. Method according to claim 1, wherein the transport protocol is the Real-time Transport Protocol.

6. Method according to claim 1, wherein the packets are comprise image data.

7. Sending device sending a data stream made up of groups of first data packets, where at least some of said first data packets comprise a first time reference for synchronizing clocks of said sending device and at least one receiver, wherein said method includes at least the following steps;
   encapsulation of at least one of said data packets in one of a MPEG packet which carries an RTP packet;
   storing the data packet in a FIFO buffer to construct the RTP packet, wherein when an RTP is ready it is sent competes with its RTP time reference corresponding to the time at which the packet was sent;
   upon transmission of said transport protocol packet, adding, to said transport protocol packet, of a second time reference for all of said at least one packet in said MPEG packet, said second time reference corresponding to a time of transmission of said MPEG packet, said second time reference having a second accuracy, and correction of said first time reference, the correction of said first time reference taking into account a difference in accuracy between a first clock having a same accuracy as said first time reference and a second clock of second accuracy used by said second time references, said second clock being derived from said first clock, and wherein the second accuracy is derived from a difference between said first and second clock frequencies.

* * * * *